United States Patent
Fujisaki

(10) Patent No.: US 12,531,298 B2
(45) Date of Patent: Jan. 20, 2026

(54) SECONDARY BATTERY INCLUDING AN EXTERIOR PART HAVING OPENINGS IN RESPECTIVE TWO FACING FACES THEREOF

(71) Applicant: TOYOTA JIDOSHA KABUSHIKI KAISHA, Toyota (JP)

(72) Inventor: Sadao Fujisaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 527 days.

(21) Appl. No.: 17/961,837

(22) Filed: Oct. 7, 2022

(65) Prior Publication Data

US 2023/0178827 A1   Jun. 8, 2023

(30) Foreign Application Priority Data

Dec. 6, 2021   (JP) ................. 2021-198102

(51) Int. Cl.
| | |
|---|---|
| *H01M 50/16* | (2021.01) |
| *H01M 10/0525* | (2010.01) |
| *H01M 50/107* | (2021.01) |
| *H01M 50/559* | (2021.01) |

(52) U.S. Cl.
CPC ....... *H01M 50/16* (2021.01); *H01M 10/0525* (2013.01); *H01M 50/107* (2021.01); *H01M 50/559* (2021.01)

(58) Field of Classification Search
CPC .. H01M 50/16; H01M 50/162; H01M 50/155; H01M 50/166; H01M 50/107; H01M 50/102; H01M 50/559; H01M 50/552; H01M 50/562; H01M 10/0525; H01M 10/052

See application file for complete search history.

(56) References Cited

U.S. PATENT DOCUMENTS

| | | | |
|---|---|---|---|
| 2011/0117404 A1 | | 5/2011 | Ahn et al. |
| 2011/0242732 A1† | | 10/2011 | Kobayashi |
| 2016/0204396 A1 | | 7/2016 | Kim et al. |
| 2018/0212210 A1† | | 7/2018 | Suzuki |

FOREIGN PATENT DOCUMENTS

| | | | | |
|---|---|---|---|---|
| JP | S47-25125 U | | 11/1972 | |
| JP | 2004-281156 | † | 10/2004 | |
| JP | 2004281156 A | * | 10/2004 | ............. H01M 2/02 |
| JP | 2006-278245 | † | 10/2006 | |
| JP | 2006-278245 A | | 10/2006 | |
| JP | 2011-108623 A | | 6/2011 | |

(Continued)

*Primary Examiner* — Raymond Alejandro
(74) *Attorney, Agent, or Firm* — Oliff PLC

(57) ABSTRACT

A secondary battery that can improve structural efficiency and includes: a power generating element; and an exterior part housing the power generating element thereinside, wherein the exterior part has: a cylindrical part having openings in respective two facing faces thereof; inner lids placed in the openings, respectively; and first resin placed so as to cover each of the openings, and each face of the inner lids on opening sides, the first resin is placed so as to fill each space between the cylindrical part and the inner lids, and the cylindrical part and the inner lids are united into one body with the first resin.

9 Claims, 15 Drawing Sheets

(56) References Cited

FOREIGN PATENT DOCUMENTS

| | | | |
|---|---|---|---|
| JP | 2013-097890 | A | 5/2013 |
| JP | 2014-216307 | † | 11/2014 |
| JP | 2014-216307 | A | 11/2014 |
| JP | 2016-530683 | A | 9/2016 |
| JP | 2017-220447 | A | 12/2017 |
| JP | 2018-116917 | A | 7/2018 |
| JP | 2020-153733 | A | 9/2020 |
| JP | 2020-173900 | A | 10/2020 |
| KR | 10-2006-0059704 | A | 6/2006 |

\* cited by examiner
† cited by third party

SECONDARY BATTERY INCLUDING AN EXTERIOR PART HAVING OPENINGS IN RESPECTIVE TWO FACING FACES THEREOF

FIELD

The present application relates to a secondary battery.

BACKGROUND

Batteries including lithium ion secondary batteries are widely used as portable power sources for personal computers and mobile terminals, and power supplies for driving vehicles. A laminated type is known as an example of a type of battery. The structure of a laminated type battery is that a power generating element is sealed inside an exterior laminate formed by laminating film laminate sheets. The laminated type battery has a sealing area that is formed by welding edge portions of the exterior laminate which are arranged as facing each other in a state where terminals electrically joined to the power generating element protrude outward from the inside of the exterior laminate. This causes the power generating element to be sealed inside the exterior laminate. The laminated type battery is also provided with sealing areas outside the power generating element which are formed by laminating and welding the laminate sheets.

Conventionally, to downsize batteries in structure has been pursued. For example, Patent Literature 1 discloses the technique of downsizing a laminated type battery by bending sealing areas along ends of the battery.

CITATION LIST

Patent Literature

Patent Literature 1: JP 2020-173900 A

SUMMARY

Technical Problem

A laminated type battery can be downsized according to the technique of Patent Literature 1. However, further improvement in structural efficiency of secondary batteries has been desired.

For example, a laminated type battery can be downsized by narrowing the width of a sealing area where electrode terminals are held (sealing width). Generally, the sealing width is necessary to be set in more than 3 mm for the following reasons: (1) a narrower sealing width prevents appropriate heat welding, which may cause a seal failure; (2) because an exterior laminate is not so rigid, an external impact may cause the adhesion at a sealing area with a narrower sealing width to be lost, so that the adhesive face cannot be kept; (3) when terminals are not parallel to the adhesive face of an exterior laminate in heat welding, a narrower sealing width weakens correction force by which the inclination is restored, which prevents appropriately heat welding, and thus, causes the probability of a seal failure to be much higher; and (4) in heat welding, a narrower sealing width causes the pressure applied to a sealing area with a heat welding head to be higher per area, so that a metal layer inside an exterior laminate bites into terminals across an insulating layer. Such metal layer's biting into terminals causes a short circuit, which is undesirable. For the above reasons, it has been difficult to narrow the sealing width to downsize a laminated type battery.

An object of the present disclosure is to provide a secondary battery that can improve structural efficiency.

Solution to Problem

As one aspect to solve the above problem, the present disclosure is provided with a secondary battery comprising: a power generating element; and an exterior part housing the power generating element thereinside, wherein the exterior part has: a cylindrical part having openings in respective two facing faces thereof; inner lids placed in the openings, respectively; and a first resin placed so as to cover each of the openings, and each face of the inner lids on opening sides, the first resin is placed so as to fill each space between the cylindrical part and the inner lids, and the cylindrical part and the inner lids are united into one body with the first resin.

The secondary battery may be in the following mode. That is, the secondary battery may further comprise: an electrode terminal connected to the power generating element, wherein the inner lids may each have the face placed on the opening side of the cylindrical part, a protruding part protruding towards an inside of the cylindrical part from an entire circumference of the face, and a space surrounded by the protruding part, at least one of the inner lids may have a through hole in the face thereof, the electrode terminal may be arranged so as to be thorough the through hole, the first resin arranged on a side of said at least one of the inner lids, said at least one of the inner lids being penetrated by the electrode terminal, may be arranged so as to further cover at least part of a periphery of the electrode terminal, and so as to fill a space between the through hole and the electrode terminal, and the cylindrical part, the inner lids, and the electrode terminal may be united into one body with the first resin.

The secondary battery may be in the following modes. That is, the exterior part may have a second resin filling an inside thereof, and the cylindrical part, the inner lids, the electrode terminal, and the power generating element may be united into one body with the second resin. The power generating element may be wrapped in an insulating resin film having water vapor barrier properties.

The cylindrical part may be in the following modes. That is, the cylindrical part may be a cylindrical metal body, or a cylindrically shaped metal laminate film. Or, the cylindrical part may be formed of two U-shaped metal plates that are superposed on each other as facing in the opposite directions, end portions of the metal plates may overlap with each other in respective opposite side faces of the cylindrical part, the cylindrical part may have a third resin arranged so as to cover each of the side faces of the cylindrical part, and the overlapping end portions of the metal plates in each of the side faces may be united into one body with the third resin. Or, the cylindrical part may be formed of one metal plate, end portions of the metal plate may overlap with each other in one side face of the cylindrical part, the cylindrical part may have a third resin arranged so as to cover the side face thereof, and the overlapping end portions of the metal plate may be united into one body with the third resin.

Advantageous Effects

The secondary battery according to the present disclosure can improve structural efficiency.

DESCRIPTION OF EMBODIMENTS

Figure 1:
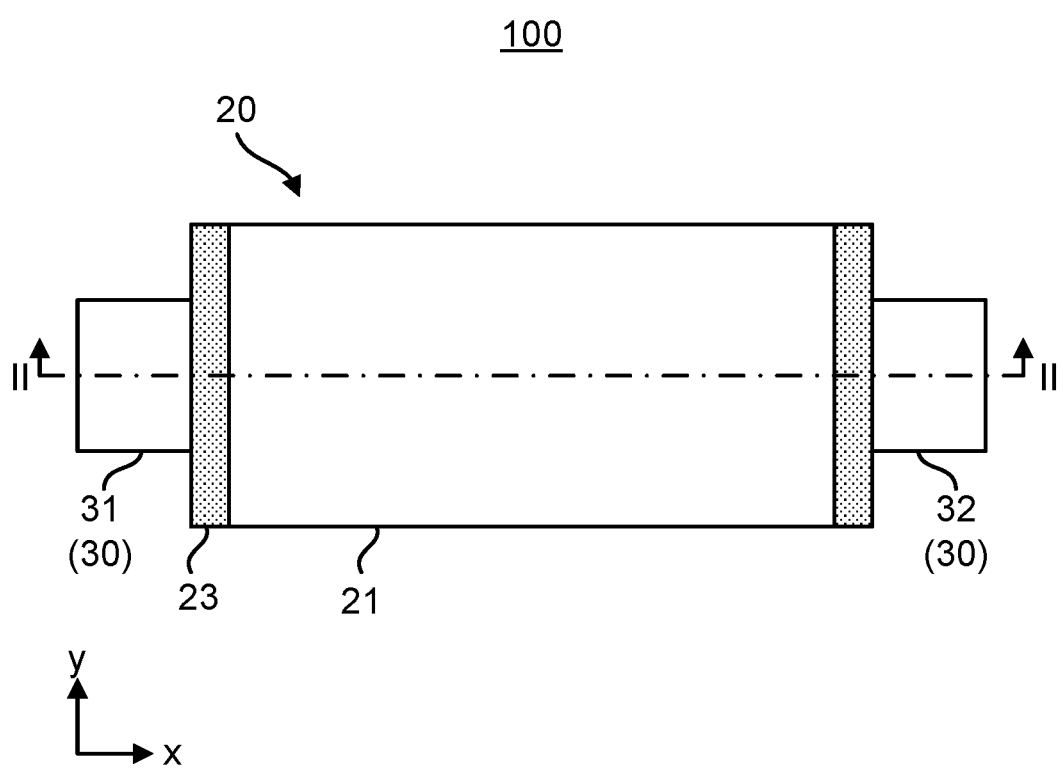
FIG. 1 is a plan view of a secondary battery 100.
Figure 2:
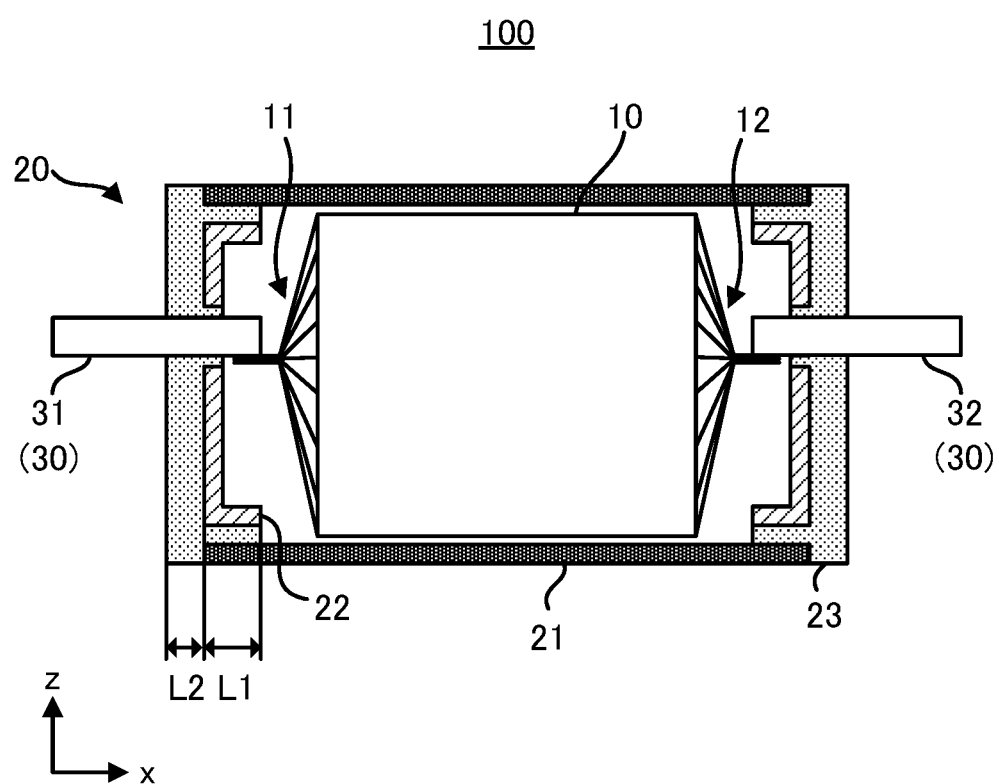
FIG. 2 is a cross-sectional view taken along II-II in FIG. 1.

A secondary battery according to the present disclosure will be described mainly using a secondary battery 100 as one embodiment. FIG. 1 is a plan view of the secondary battery 100. FIG. 2 is a cross-sectional view taken along II-II in FIG. 1. Here, in FIGS. 1 and 2, the length direction of the secondary battery 100 is indicated by x; the width direction of the secondary battery 100 is indicated by y; and the thickness direction of the secondary battery 100 is indicated by z. These directions have an orthogonal relationship with one another.

Figure 3:
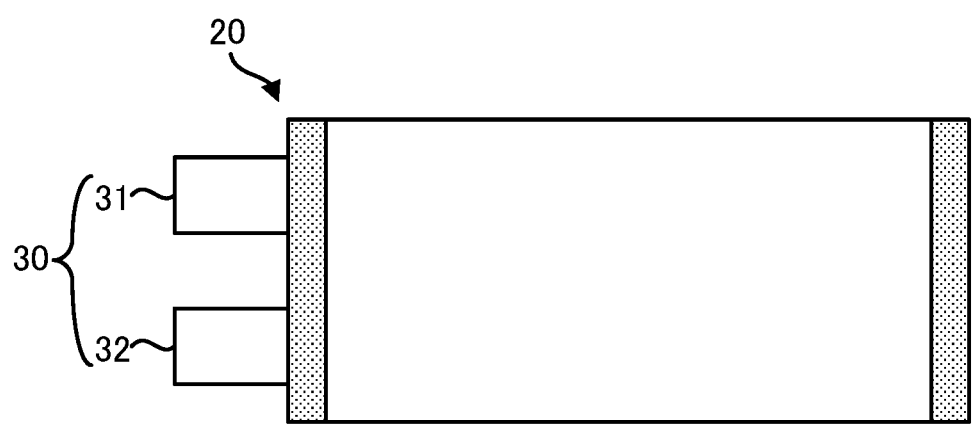
FIG. 3 is a plan view of a secondary battery as one example which is provided with a cathode terminal 31 and an anode terminal 32 which are arranged so as to protrude from the same face of an exterior part 20 which is along the width direction.

The secondary battery 100 is provided with a power generating element 10, and an exterior part 20 that houses the power generating element 10 thereinside. The secondary battery 100 is also provided with a cathode terminal 31 and an anode terminal 32 (hereinafter may be collectively referred to as "electrode terminals 30") for connecting to an external power source or an electrical load. The cathode terminal 31 and the anode terminal 32 are placed so as to protrude from respective faces of the exterior part 20 which are along the width direction. The positions where the cathode terminal 31 and the anode terminal 32 are placed are not limited to this. The cathode terminal 31 and the anode terminal 32 may be placed so as to protrude from the same face of the exterior part 20 which is along the width direction. As one example, FIG. 3 shows the secondary battery provided with the cathode terminal 31 and the anode terminal 32, which are placed so as to protrude from the same face of the exterior part 20 which is along the width direction.

<Power Generating Element 10>

The power generating element 10 is formed by layering a cathode current collector foil, a cathode active material layer, an electrolyte layer, an anode active material layer, and an anode current collector foil (hereinafter may be collectively referred to as "electrode elements"). The electrode elements are layered in the thickness direction. The number of the layered electrode element(s) of each kind is not particularly limited. The power generating element 10 in FIG. 2 is formed by stacking these plural electrode elements of each kind. These electrode elements may be stacked electrically in series, or electrically in parallel.

The power generating element 10 in FIG. 2 has a sheet shape, and has a rectangular shape in a plan view. The power generating element 10 is not particularly limited as long as having a shape that allows the power generating element 10 to be housed inside the exterior part 20. As shown in FIG. 2, each type of the current collector foils in the power generating element 10 may be provided with a tab 11 or 12 for connecting to any of the electrode terminals 30. The cathode current collector foils are each provided with the tab 11, and the tabs 11 are electrically connected to the cathode terminal 31. Likewise, the anode current collector foils are each provided with the tab 12, and the tabs 12 are electrically connected to the anode terminal 32.

In order to suppress a short circuit caused by the contact with a cylindrical part 21, the power generating element 10 may be insulated by a predetermined process. For example, the power generating element 10 may be wrapped in an insulating film; an insulating sheet may be placed between the power generating element 10 and the cylindrical part 21; or an insulating tape may be stuck on the power generating element 10 or an inner surface of the cylindrical part 21. In this way, the power generating element 10 may be insulated by placing a predetermined insulating layer on the periphery thereof.

The power generating element 10 and the cylindrical part 21 may be in contact with each other as long as either one of them is insulated. In this case, the thickness of each inner lid 22 may be thinner than the thickness of the power generating element 10 by a thickness of a first resin 23 with which each space between the cylindrical part 21 and the inner lids 22 is filled.

The power generating element 10 may be a solid-state battery or a solution-based battery, and is preferably a solid-state battery. The type of the power generating element 10 is not particularly limited, but may be a power generating element for lithium ion secondary batteries or sodium ion secondary batteries. The material of the power generating element 10, which is a power generating element for lithium ion secondary batteries, will be hereinafter described.

(Cathode Current Collector Foil and Anode Current Collector Foil)

The cathode current collector foil and the anode current collector foil are each sheet metal foil. The metal constituting the cathode current collector foil or the anode current collector foil is not particularly limited, but examples thereof include Cu, Ni, Cr, Au, Pt, Ag, Al, Fe, Ti, Zn, Co and stainless steel. Al is preferrable as the metal constituting the cathode current collector foil. Cu is preferable as the material constituting the anode current collector foil.

The cathode current collector foil and the anode current collector foil may each have some coating (for example, a carbon coating) on the surfaces thereof for adjusting the resistance. For example, the cathode current collector foil and the anode current collector foil may each have a thickness of 0.1 μm to 1 mm.

(Cathode Active Material Layer)

The cathode active material layer is a sheet layer containing a cathode active material. The cathode active material is not particularly limited as long as the cathode active material may be used for lithium ion secondary batteries. Examples of the cathode active material include various lithium-containing composite oxides such as lithium cobaltate, lithium nickelate, lithium manganate, lithium nickel cobalt manganate, and spinel lithium compounds.

The cathode active material layer may optionally contain a conductive additive and a binder. The binder is not particularly limited as long as the binder may be used for lithium ion secondary batteries. Examples of the binder include butadiene rubber (BR), butyl rubber (IIR), acrylate-butadiene rubber (ABR), and polyvinylidene fluoride (PVdF). The conductive additive is not particularly limited as long as the conductive additive may be used for lithium ion secondary batteries. Examples of the conductive additive include carbon materials such as acetylene black and Ketjenblack, and metallic materials such as nickel, aluminum, and stainless steel.

When the secondary battery 100 is an all-solid-state battery, the cathode active material layer may optionally contain a solid electrolyte. The solid electrolyte is not particularly limited as long as the solid electrolyte may be used for lithium ion secondary batteries. For example, the solid electrolyte may be an organic polymer electrolyte or an inorganic solid electrolyte, and is preferably an inorganic solid electrolyte because inorganic solid electrolytes have higher ion conductivity than, and superior heat resistance to organic polymer electrolytes. The inorganic solid electrolyte may be an oxide solid electrolyte or a sulfide solid electrolyte, and is preferably a sulfide solid electrolyte. Examples of the oxide solid electrolyte include lithium lanthanum zirconate, LiPON, $Li_{1+x}Al_xGe_{2-x}(PO_4)_3$, Li—SiO based glasses, and Li—Al—S—O based glasses. Examples of the sulfide solid electrolyte include $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$, and $Li_2S$—$P_2S_5$—$GeS_2$.

The contents of the components in the cathode active material layer may be each appropriately set according to the purpose. The surface of the cathode active material may be coated with an oxide layer such as a lithium niobate layer, a lithium titanate layer, and a lithium phosphate layer. For example, the cathode active material layer may have a thickness of 0.1 μm to 1 mm.

(Anode Active Material Layer)

The anode active material layer is a sheet layer containing an anode active material. The anode active material is not particularly limited as long as the anode active material may be used for lithium ion secondary batteries. Examples of the anode active material include silicon-based active materials such as Si, Si alloys, and silicon oxide; carbon-based active materials such as graphite and hard carbon; various oxide-based active materials such as lithium titanate; lithium metal, and lithium alloys.

The anode active material layer may optionally contain a conductive additive and a binder. The conductive additive and the binder may be appropriately selected from conductive additives and binders that may be used for the cathode active material layer. When the secondary battery 100 is an all-solid-state battery, the anode active material layer may optionally contain a solid electrolyte. The solid electrolyte may be appropriately selected from solid electrolytes that may be used for the cathode active material layer.

The contents of the components in the anode active material layer may be each appropriately set according to the purpose. For example, the anode active material layer may have a thickness of 0.1 μm to 1 mm.

(Electrolyte Layer)

When the secondary battery 100 is an all-solid-state battery, the electrolyte layer is a sheet solid electrolyte layer. The solid electrolyte layer contains a solid electrolyte. The solid electrolyte may be appropriately selected from solid electrolytes that may be used for the cathode active material layer. The solid electrolyte layer may optionally contain a binder. The binder may be appropriately selected from binders that may be used for the cathode active material layer. The contents of the components in the solid electrolyte layer may be each appropriately set according to the purpose. For example, the solid electrolyte layer may have a thickness of 0.1 μm to 1 mm.

When the secondary battery 100 is a solution-based battery, the electrolyte layer contains an electrolytic solution and a separator. The electrolytic solution or the separator is not particularly limited as long as the electrolytic solution and the separator may be each used for lithium ion secondary batteries. An example of the separator is a porous sheet (film) made from polyolefin such as polyethylene (PE) and polypropylene (PP). For example, the separator may have a thickness of 0.1 μm to 1 mm. The electrolytic solution usually contains a nonaqueous solvent and a supporting salt. Examples of the nonaqueous solvent include carbonates, ethers, esters, nitriles, sulfones, and lactones. Examples of the supporting salt include $LiPF_6$, $LiBF_4$, lithium bis(fluorosulfonyl)imide (LiFSI), and lithium bis(trifluoromethane) sulfonimide (LiTFSI). The concentration of the supporting salt in the electrolytic solution is not particularly limited, but may be, for example, 0.5 mol/L to 5 mol/L. Any optional component such as a gas forming agent, a film-former, a dispersant, and a thickener may be added to the electrolytic solution.

<Exterior Part 20>

The exterior part 20 has: the cylindrical part 21 having openings 21a in two opposite faces thereof; the inner lids 22 placed in the openings 21a, respectively; and the first resin 23 placed so as to cover each of the openings 21a, and each face 22a of the inner lids 22 on the opening sides. The first resin 23 is placed so as to fill each space between the cylindrical part 21 and the inner lids 22. The cylindrical part 21 and the inner lids 22 are united into one body with the first resin 23.

(Cylindrical Part 21)

Figure 4A:
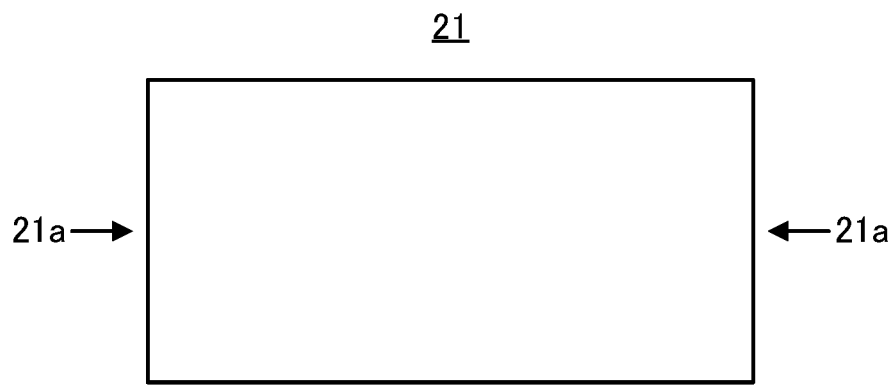
FIG. 4A is a plan view of a cylindrical part 21.
Figure 4B:
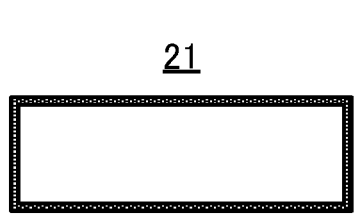
FIG. 4B is a cross-sectional view of the cylindrical part 21 in the width direction.
Figure 4C:
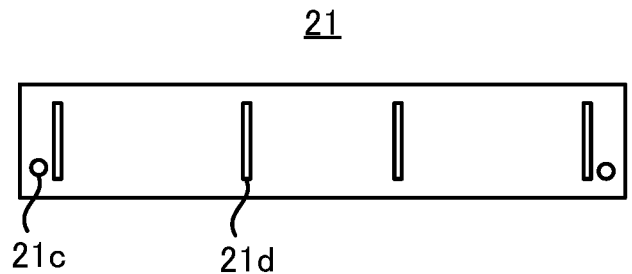
FIG. 4C is a side view of the cylindrical part 21 looking in the width direction.

The cylindrical part 21 has a hollow shape having the openings 21a in two opposite faces thereof. The opening 21a are disposed in faces of the cylindrical part 21 on both sides in the length direction, respectively. The cylindrical part 21 has a rectangular cross-sectional shape in the width direction. The cross-sectional shape of the cylindrical part is not limited to this. FIG. 4A is a plan view of the cylindrical part 21, FIG. 4B is a cross-sectional view of the cylindrical part 21 in the width direction, and FIG. 4C is a side view of the cylindrical part 21 looking in the width direction.

The cylindrical part 21 is formed from a metal having excellent water vapor barrier properties in view of preventing the power generating element from deteriorating. Examples of a metal having excellent water vapor barrier properties include metals having a water vapor permeability $1.0 \times 10\text{-}4$ g/m$^2$·24 h or less. A lower water vapor permeability means more excellent water vapor barrier properties. Examples of such metals include aluminum, stainless steel, SUS, and duralumin. Aluminum may be used as the material of the cylindrical part 21 in view of lightweight properties and processability. Aluminum is also advantageous due to its inexpensiveness.

The water vapor permeability can be measured using the dish method conforming to JIS Z 0208, or the gas chromatography conforming to JIS K 7129.

Here, the cylindrical part 21 may be insulated by a predetermined process in view of suppressing a short circuit caused by the contact with the power generating element 10. For example, an insulating material such as an insulating resin sheet may be placed between the power generating element 10 and the cylindrical part 21. For example, such an insulating material may be placed between faces of the power generating element 10 in the thickness direction, and the cylindrical part 21. This can lead to suppression of electrical connection between the power generating element 10 and the cylindrical part 21 to suppress a short circuit of the secondary battery 100. A metal laminate film (e.g., aluminum laminate film) formed by covering at least the inner surface of the cylindrical part 21 with an insulating resin may be used. This can lead to suppression of electrical connection between the power generating element 10 and the cylindrical part 21 to suppress a short circuit of the secondary battery 100 without placement of an insulating material. A metal laminate film is a multilayer body formed by putting a resin (such as polypropylene, nylon, and PET) on the surface of a metal layer. In this way, the cylindrical part 21 may be insulated by placing a predetermined insulating layer on the inner peripheral portion thereof.

A metal layer of a metal laminate film usually has a thickness of approximately 0.04 mm, which is relatively thin, and thus, has low strength, which is problematic. Therefore, for example, the cylindrical part 21 is preferably formed from a metal having a thickness of 0.05 mm to 0.2 mm, and more preferably formed from a metal having a thickness of 0.1 mm to 0.2 mm. A metal laminate film including a metal layer having a thickness in the above-described range may be used for the cylindrical part 21. A cylindrically shaped metal laminate film is used when a metal laminate film is used for the cylindrical part 21.

The cylindrical part 21 may be provided with protruding parts 21b at the ends in the length direction. Specifically, the cylindrical part 21 may be provided with the protruding part 21b on at least one of the faces in the thickness and width directions at each end thereof in the length direction. The protruding parts 21b included in the cylindrical part 21 function to surely have areas where the first resin 23 is adhered to, to improve the adhesive force. The protruding parts 21b are parts protruding beyond the inner lids 22 outward, respectively.

Figure 5A:
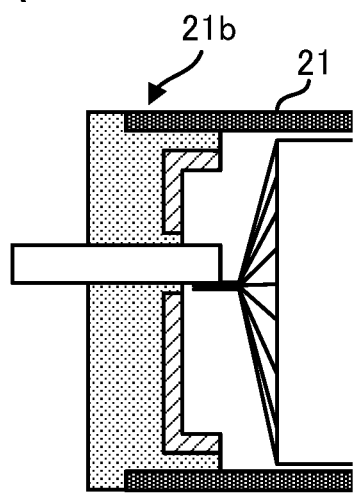
FIG. 5A is a cross-sectional view of the cylindrical part 21 in the vicinity of an opening 21a: the cylindrical part 21 is provided with protruding parts 21b on ends of respective faces thereof in the thickness direction.
Figure 5B:
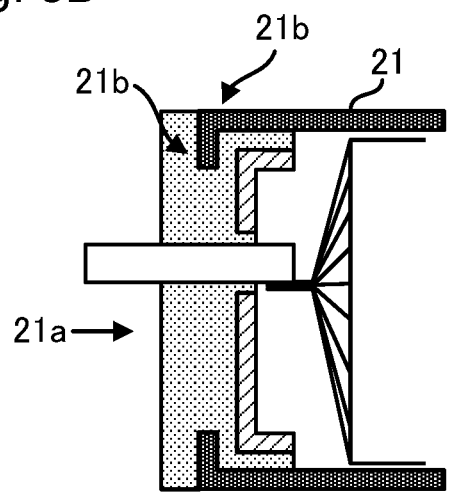
FIG. 5B is a cross-sectional view of the cylindrical part 21 in the vicinity of the opening 21a: the cylindrical part 21 is provided with the protruding parts 21b bending inward.

FIG. 5A is a cross-sectional view of the cylindrical part 21 in the vicinity of one of the openings 21a: the cylindrical part 21 is provided with the protruding parts 21b at respective ends of faces thereof in the thickness direction. FIG. 5B is a cross-sectional view of the cylindrical part 21 in the vicinity of one of the openings 21a: the cylindrical part 21 is provided with the inwardly bending protruding parts 21b.

The cylindrical part 21 shown in FIG. 5A is provided with the protruding parts 21b at respective ends of the faces in the thickness direction. That is, the ends of the faces of the cylindrical part 21 in the thickness direction protrude more than the ends of the faces of the cylindrical part 21 in the width direction in structure, respectively. As shown in FIG. 5A, the cylindrical part 21 having the protruding parts 21b can increase areas where the first resin 23 is adhered thereto, and thus, can improve the adhesive force. In other words, the first resin 23 can be prevented from coming off. When the first resin 23 comes off, water vapor barrier properties cannot be secured, which is undesirable. As shown in FIG. 5B, the protruding parts 21b may each have a shape bending toward the inside of the cylindrical part 21. This makes it easy to position the inner lids 22. In this case, an opening shaped by two protruding parts 21 is the opening 21a. An angle between each of the protruding parts 21b and a face of the cylindrical part 21 (face having said each of the protruding parts 21b) is not particularly limited, but can be any angle of 0° to 180°, and is preferably 15° to 135°. The length of each of the protruding parts 21b is not particularly limited, but is, for example, in the range of 0.5 mm to 2 mm.

(Inner Lid 22)

Figure 6A:
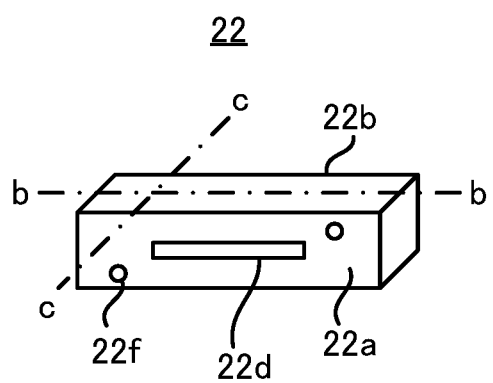
FIG. 6A is a perspective view of an inner lid 22.
Figure 6B:
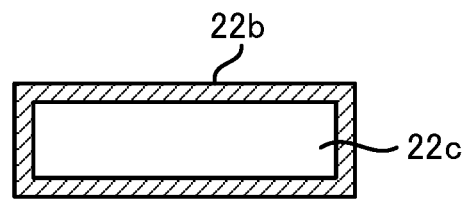
FIG. 6B is a cross-sectional view taken along b-b in FIG. 6A.
Figure 6C:
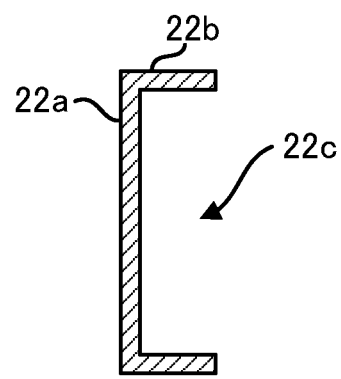
FIG. 6C is a cross-sectional view taken along c-c in FIG. 6A.

The inner lid 22 is placed in the opening 21a on each side of the cylindrical part 21. The inner lid 22 has a rectangular circumferential shape. The circumferential shape of the inner lid 22 is however not particularly limited as long as being along a cross-sectional shape of the cylindrical part 21 in the width direction. FIG. 6A is a perspective view of the inner lid 22, FIG. 6B is a cross-sectional view taken along b-b in FIG. 6A, and FIG. 6C is a cross-sectional view taken along c-c in FIG. 6A.

The inner lid 22 has the face 22a to be arranged on the opening 21a side of the cylindrical part 21, a protruding part 22b protruding from the entire circumference of the face 22a toward the inside of the cylindrical part 21, and a space 22c surrounded by the protruding part 22b. The space 22c faces the inside of the cylindrical part 21.

The "protruding part 22b protruding from the entire circumference of the face 22a toward the inside of the cylindrical part 21" consists of portions protruding from both ends of the face 22a in the thickness direction and both ends of the face 22a in the width direction toward the inside of the cylindrical part 21. These portions are connected to one another at the corners of the face 22a. That is, the protruding part 22b is a member protruding from the entire circumferential part of the face 22a. The length L1 of the protruding part 22b is not particularly limited as long as water vapor barrier properties can be sufficiently exhibited when the cylindrical part 21 and the inner lid 22 are united into one body with the first resin 23. For example, the length L1 may be at least 0.5 mm, and may be at most 3 mm.

The face 22a of the inner lid 22 has a through hole 22d. The electrode terminal 30 (the cathode terminal 31 or the anode terminal 32) is arranged so as to be thorough the through hole 22d. As in FIG. 1, when the electrode terminals 30 are arranged on different faces of the exterior part 20 which are along the width direction, both of the inner lids 22 have the through holes 22d. In contrast, as in FIG. 3, when the electrode terminals 30 are arranged on the same face of the exterior part 20 which is along the width direction, it is sufficient to provide at least one of the inner lids 22 (the inner lid 22 on the side where the electrode terminals 30 are arranged) with the through hole 22d. In this case, the number of the through holes 22d may be 2 in order to arrange the electrode terminals 30 through the through holes 22d, respectively. Alternatively, the electrode terminals 30 may be arranged through one through hole 22d.

Figure 7A:
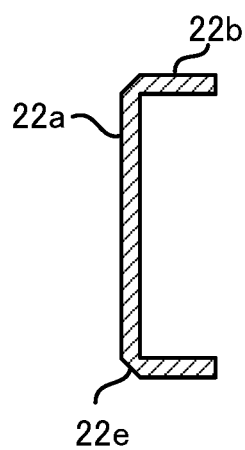
FIG. 7A is a cross-sectional view of the inner lid 22 having a tapered part 22e.
Figure 7B:
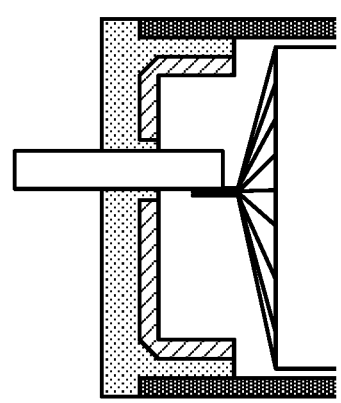
FIG. 7B shows an example use of the inner lid 22 having the tapered part 22e.

The inner lid 22 may be made of one member, or at least two members. The inner lid 22 may be made of two members each having a shape of the cut inner lid 22 including the through hole 22d and having a divided length of the entire inner lid 22 in the thickness direction in view of easily arranging the electrode terminal(s) 30. The inner lid 22 may have a tapered part 22e between the face 22a and the protruding part 22b. As one example, FIG. 7A is a cross-sectional view of the inner lid 22 having the tapered part 22e, and FIG. 7B shows an example use of the inner lid 22 having the tapered part 22e.

The inner lid 22 may be formed from a material having excellent water vapor barrier properties in view of preventing the power generating element from deteriorating. Examples of a material having excellent water vapor barrier properties include materials having a water vapor permeability $1.0 \times 10^{-4}$ $g/m^2 \cdot 24$ h or less. Examples of such a material include metals and glasses. In view of processability, a metal may be used as the material of the inner lid 22. Examples of the metal include aluminum, stainless steel, SUS, and duralumin. Aluminum may be used as the material of the inner lid 22 in view of lightweight properties and processability. Aluminum is also advantageous due to its inexpensiveness.

Here, when the inner lid 22 is formed from a metal, a predetermined insulating process may be performed in view of suppressing a short circuit caused by the contact of the inner lid 22 with the power generating element 10, the cylindrical part 21, and the electrode terminal(s) 30. For example, an insulating material such as an insulating resin sheet may be placed between the power generating element 10 and the inner lid 22 in view of suppressing a short circuit caused by the contact of the inner lid 22 with the power generating element 10. This can lead to suppression of electrical connection between the power generating element 10 and the inner lid 22 to suppress a short circuit of the secondary battery 100. In view of suppressing a short circuit caused by the contact of the inner lid 22 with the cylindrical part 21, a laminated metal formed by covering at least the inner surface of the cylindrical part 21 with an insulating resin may be used. This can lead to suppression of electrical connection between the power generating element 10 and the cylindrical part 21 to suppress a short circuit of the secondary battery 100 without placement of an insulating material. In order to suppress a short circuit caused by the contact with the cylindrical part 21, the circumferential part of the inner lid 22 may be wrapped in an insulating film; or an insulating tape may be stuck on the circumferential part of the inner lid 22. In this way, the inner lid 22 may be insulated by placing a predetermined insulating layer on the circumferential part thereof. Further, in order to suppress a short circuit caused by the contact of the inner lid 22 with the electrode terminal(s) 30, either one of the through hole 22d and the electrode terminal(s) 30 may be insulated by placing a predetermined insulating layer thereon.

(First Resin 23)

The first resin 23 is placed so as to cover each of the openings 21a, and each of the faces 22a of the inner lids 22 on the opening sides. The first resin 23 is placed so as to fill each space between the cylindrical part 21 and the inner lids 22. The cylindrical part 21 and the inner lids 22 are united into one body with the first resin 23. When the electrode terminal 30 is arranged in at least one of the inner lids 22, the first resin 23 is placed, so that at least part of the periphery of the electrode terminal 30 is also coated therewith and the first resin 23 fills the space between the through hole 22d and the electrode terminal 30. Then, the cylindrical part 21, the inner lid 22, and the electrode terminal are united into one body with the first resin 23. This allows water vapor barrier properties to be surely secured in the secondary battery 100.

As shown in FIG. 2, the first resin 23 covers the openings 21a, and the faces 22a of the inner lids 22 on the openings 21a sides; and also fills each space present between the cylindrical part 21 and the inner lids 22. The "each space present between the cylindrical part 21 and the inner lids 22" is a space present between the inner surface of the cylindrical part 21 and each of the circumferential parts of the inner lids 22. The openings 21a covered with the first resin 23 represent boundaries of these spaces on the openings 21a sides. In order to form such spaces, the inner lids 22 are each preferably made to be slightly smaller than the outer shape of the cylindrical part 21. Placing the first resin 23 as described above causes the cylindrical part 21 and the inner lids 22 to be united into one body with the first resin 23. Here, it is sufficient that the first resin 23 fills at least part of each space present between the cylindrical part 21 and the inner lids 22; but preferably fills each entire space as in FIG. 2 in view of securing water vapor barrier properties. As described later, when the inside of the cylindrical part 21 is filled with a second resin 24, the second resin 24 may be also placed in the spaces formed of the cylindrical part 21 and the inner lids 22, in addition to the first resin 23.

At least part of the entire periphery of the electrode terminal(s) 30 is coated with the first resin 23, and the first resin 23 fills the space between the electrode terminal(s) 30 and the through hole 22d. "At least part of the entire periphery of the electrode terminal(s) 30" is the entire periphery in a section of the electrode terminal(s) 30 which is from the face 22a toward the outside and which has a predetermined length. The predetermined length is the length L2 in FIG. 2. The "space present between the electrode terminal(s) 30 and the through hole 22d" is a space present between the peripheral part of the electrode terminal(s) 30, and the inner surface of the through hole 22d. In order to form such a space, the through hole 22d is preferably made to be slightly larger than the electrode terminal(s) 30. Placing the first resin 23 as described above causes the inner lid 22 and the electrode terminal(s) 30 to be united into one body with the first resin 23.

In this way, the first resin 23 fills each path (space) via which water vapor penetrates the inside of the exterior part 20 from the outside, which makes it possible to sufficiently suppress penetration of water vapor toward the inside of the exterior part 20. In other words, this means that there may be some space that water vapor can penetrate present between the cylindrical part 21 and the inner lids 22, and between the electrode terminals 30 and the through holes 22, in the exterior part 20. The first resin 23 fills such a space, which makes it unnecessary to strictly design the cylindrical part 21 and the inner lids 22.

Here, "united into one body" means that each material is adhered with resin, to be united to such an extent that the materials can be recognized as one member. "(U)nited into one body" with the first resin can be performed by: placing, in a predetermined metal mold, an intermediate member formed by placing the inner lids 22 in the openings 21a of the cylindrical part 21, which houses the power generating element 10 thereinside; and pouring and curing the first resin in the metal mold. In this way, the exterior part 20 can be manufactured by one-body molding using the first resin 23.

Here, as shown in FIG. 7B, when the inner lid 22 is provided with the tapered part 22e, the first resin 23 can penetrate the space between the tapered part 22e and the cylindrical part 21, which can increase an area where the first resin 23 and the inner lid 22 adhere to each other, and thus, can improve the adhesive strength in these members.

The length L2 from the end of the first resin 23 to the face 22a of the inner lid 22 on the opening side is not particularly limited, but may be at least 0.5 mm, and may be within the range of at most 2 mm, in view of water vapor barrier properties.

In this way, the power generating element 10 is sealed in the secondary battery 100, using the exterior part 20 instead of a conventional exterior laminate, and thereby, water vapor barrier properties equal to or more excellent than those offered by a conventional exterior laminate are offered. A seal failure may occur to a conventional exterior laminate when ends of the exterior laminate are heat-welded after a power generating element is housed in the conventional exterior laminate. In such a case, water vapor can penetrate a seal failure portion, which prevents water vapor barrier properties from being guaranteed. In contrast, the power generating element 10 is sealed in the secondary battery 100 inside the exterior part 20, using the first resin 23, which makes it very difficult for any failure caused by sealing to occur. Therefore, it is not necessary to inspect (leak-check) water vapor barrier properties after the secondary battery 100 is manufactured.

In view of preventing the power generating element from deteriorating, a resin having water vapor barrier properties is used for the first resin 23. Examples of a resin having water vapor barrier properties include resins having a water vapor permeability of $1.0 \times 10^{-4}$ g/m²·24 h to $50 \times 10^{-4}$ g/m²·24 h. The resin is not particularly limited as long as being such, but examples thereof include thermoplastic resins. Examples of the thermoplastic resins include polypropylene and polyester.

<Electrode Terminals 30>

The electrode terminals 30 include the cathode terminal 31 and the anode terminal 32, and are electrically connected to the power generating element 10. Specifically, the cathode terminal 31 is electrically connected to the cathode current collector foil (tab 11); and the anode terminal 32 is electrically connected to the anode current collector foil (tab 12). The connecting way is not particularly limited. For example, the electrode terminals and the current collector foils may be joined to each other using ultrasonic waves.

The electrode terminals 30 are arranged so as to be through the through holes 22d of the inner lids 22 as described above, and protrude outward from the openings 21a. At least parts of the respective entire peripheries of the electrode terminals 30 are coated with the first resin 23, and the first resin 23 fills each space between the electrode terminals 30 and the through holes 22d, and thereby, the inner lids 22 and the electrode terminals are united into one body with the first resin 23.

The materials of the electrode terminals 30 are not particularly limited, but may be appropriately selected from metals that may be used for the current collector foils.

<Improvement of Structural Efficiency>

Figure 8A:
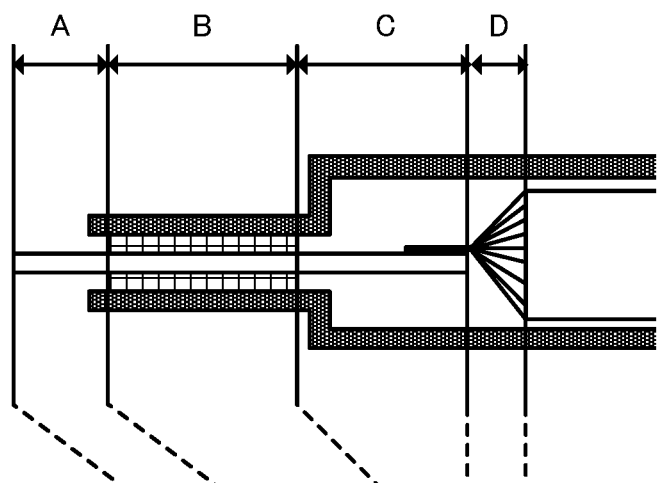
FIGS. 8A and 8B show comparison between a conventional laminated type battery (FIG. 8A) and the secondary battery 100 (FIG. 8B) in a cross-sectional view in the length direction.
Figure 8B:
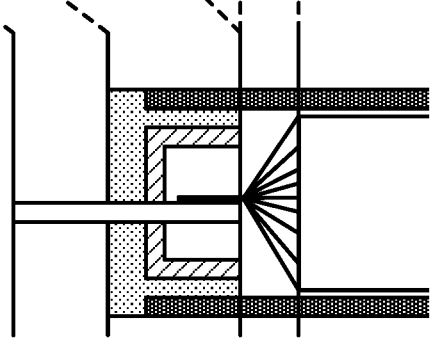
Figure 9A:
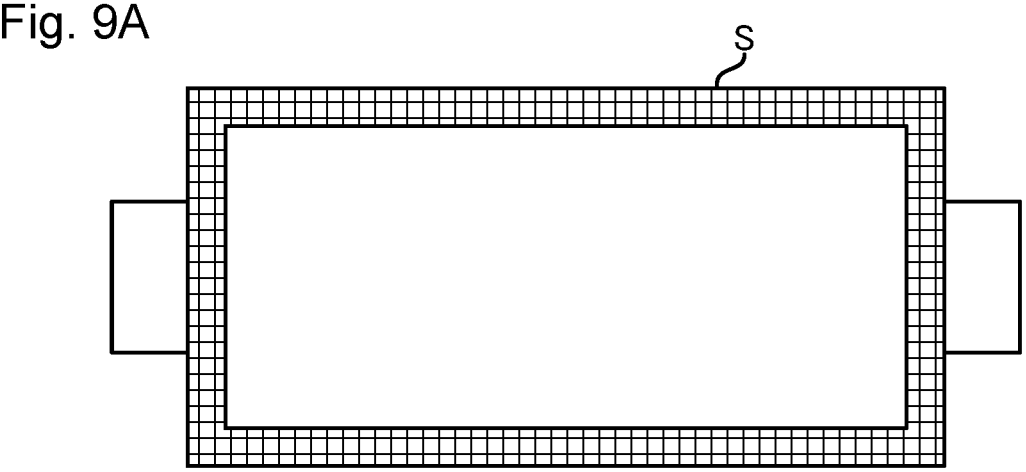
FIGS. 9A and 9B show comparison between a conventional laminated type battery (FIG. 9A) and the secondary battery 100 (FIG. 9B) in a plan view.
Figure 9B:
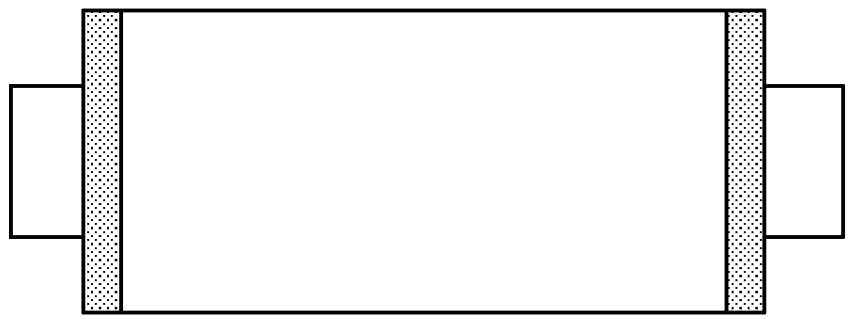

Next, improvement of structural efficiency by the secondary battery 100 will be described. FIGS. 8A to 9B show comparison between a conventional laminated type battery and the secondary battery 100. FIGS. 8A and 8B show comparison between a conventional laminated type battery (FIG. 8A) and the secondary battery 100 (FIG. 8B) in a cross-sectional view in the length direction. FIGS. 9A and 9B show comparison between a conventional laminated type battery (FIG. 9A) and the secondary battery 100 (FIG. 9B) in a plan view.

As shown in FIG. 8A, a conventional laminated type battery has a terminal part protruding from an exterior laminate (section A), a heat welding part where the exterior laminate is heat-welded (section B), a joining part where an electrode terminal and current collector foils are joined to each other (section C), and a current collector foil part where plural current collector foils that are connected to a power generating element are present (section D).

As shown in FIG. 8B, the lengths of the portions of the secondary battery 100 which correspond to the section A and the section D are the same as the section A and the section D of a conventional laminated type battery, respectively. In contrast, the secondary battery 100 where the exterior part 20 is used allows the lengths of the portions thereof corresponding to the section B and the section C to be shorter than the section B and the section C of a conventional laminated type battery, respectively. Specifically, refer to the following.

First, the reason why the length of the portion corresponding to the section B shortens will be described. Generally, the section B (sealing width) of a conventional laminated type battery is necessary to be set in more than 3 mm for the following reasons: (1) a narrower sealing width prevents appropriate heat welding, which may cause a seal failure; (2) because an exterior laminate is not so rigid, an external impact may cause the adhesion at a sealing area with a narrower sealing width to be lost, so that the adhesive face cannot be kept; (3) when a terminal is not parallel to the adhesive face of the exterior laminate in heat welding, a narrower sealing width weakens correction force by which the inclination is restored, which prevents appropriately heat welding, and thus, causes the probability of a seal failure to be much higher; and (4) in heat welding, a narrower sealing width causes the pressure applied to the sealing area with a heat welding head to be higher per area, so that a metal layer inside the exterior laminate bites into the terminal across an insulating layer. Such metal layer's biting into the terminal causes a short circuit, which is undesirable.

On the other hand, the exterior part 20 formed by uniting the cylindrical part 21 and the inner lids 22 into one body with the first resin 23 is used in the secondary battery 100. In this way, one-body uniting with the first resin 23 can lead to suppression of an adhesive failure of the cylindrical part 21 to the inner lids 22 at an extremely high level. In addition, appropriate adhesion can be performed even when any of the inner lids 22 inclines, so that some space between the cylindrical part 21 and any of the inner lids 22 are not parallel. Further, a short circuit hardly occurs because of no heat welding. One-body uniting with the first resin 23 also leads to secure rigidity, and therefor, the adhered portion is prevented from coming off. Therefore, the secondary battery 100 allows the length of the portion thereof corresponding to the section B of a conventional laminated type battery (L1+L2) to be set in at most 3 mm. This length may be at most 2 mm. Thus, the secondary battery 100 allows the width of the portion thereof which corresponds to the section B to be shorter than the section B of a conventional laminated type battery.

Next, the reason why the length of the portion corresponding to the section C shortens will be described. As shown in FIGS. 8A and 8B, the inner lid 22 of the secondary battery 100 has the space 22c inside the protruding part 22b. In the space 22c, the electrode terminal 30 and the current collector foil(s) are joined to each other. In this way, the secondary battery 100 enables the space 22c of the inner lid 22 to be effectively utilized. Therefore, in the secondary battery 100, the length of the portion corresponding to the section C can be shortened apparently. As shown in FIG. 8B, even one section in the secondary battery 100 can function as the sections B and C. According to this, the secondary battery 100 allows the structure to be more efficient than a conventional laminated type battery.

Next, FIGS. 9A and 9B will be described. As shown in FIGS. 9A and 9B, a conventional laminated type battery needs a heat welding part S along four sides of the circumference at a maximum. In contrast, the structural efficiency of both the ends of the secondary battery 100 in the length direction is improved by the exterior part 20 as described above. The cylindrical part 21, which is a cylindrical metal body, is used in the secondary battery 100, which makes any heat welding part unnecessary on both the sides in the width direction. Therefore, the structural efficiency of the secondary battery 100 is improved in this point. No heat welding part on both the sides in the width direction improves water vapor barrier properties.

As the above, the structural efficiency of the secondary battery 100 is largely improved compared to a conventional laminated type battery.

Here, the advantages of the secondary battery 100 compared to a secondary battery in which a power generating element is sealed using an exterior laminate and inner lids will be described. It would be considered that the structural efficiency of a secondary battery can be improved compared to a conventional laminated type battery by: placing inner lids in openings of a cylindrical exterior laminate; and heat-welding the exterior laminate and the circumferential faces of the inner lids because the spaces inside the inner lids can be used. However, in this case, it is difficult to shorten the sealing width to at most 3 mm because the exterior laminate and the inner lids are adhered to each other by heat welding; specifically, for the following reasons: (1) a narrower sealing width may cause a seal failure; (2) because the exterior laminate is not so rigid, an external impact may cause the adhesion at a sealing area with a narrower sealing width to be lost, so that the adhesive face cannot be kept; (3) when any of the inner lids inclines due to an external impact, correction force by which the inclination is restored weakens, so that the adhesive face cannot be kept appropriately; and (4) when the circumferential face of any of the inner lids is not parallel to the adhesive face of the exterior laminate in heat welding, a narrower sealing width weakens correction force by which the inclination is restored, which causes the probability of a seal failure to be much higher. When the exterior laminate is shaped into a cylinder, some sealing area may be necessary on a side face of the exterior laminate. For the above reasons, the structural efficiency of the secondary battery 100 is improved even compared to the secondary battery formed by combining the exterior laminate and the inner lids.

The secondary battery 100 also has manufacturing advantages. A second battery has a problem of difficulty in heat welding because inner lids cannot be held from the inside when an exterior laminate and circumferential faces of the inner lids are heat-welded. In contrast, the above-described problem does not arise from the secondary battery 100 because the cylindrical part 21 and the inner lids 22 are placed in, and the first resin 23 is poured into a predetermined metal mold, which can lead to these members united into one body. Further, such one-body uniting is performed with a predetermined metal mold after the power generating element 10 is housed in the cylindrical part 21. Thus, assembly performance of each member is well and the accuracy of dimension is also well compared with the case where an exterior laminate is used.

<Suppress Short Circuit between Power Generating Element 10 and Exterior Part 20>

When the cylindrical part 21 and the inner lids 22 are made from metal, an insulating material may be placed between the power generating element 10 and these members as described above in view of suppressing a short circuit caused by the contact of the power generating element 10 and these members. Specific embodiments of placing an insulating material will be hereinafter described.

Figure 10:
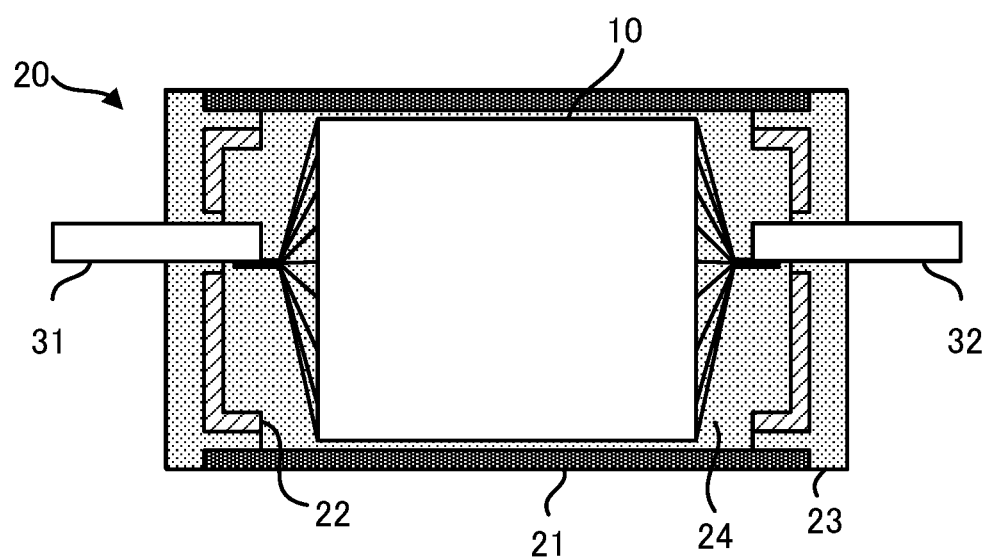
FIG. 10 is a cross-sectional view of a secondary battery 101 in the length direction.

First, a secondary battery 101 formed by filling the inside of the exterior part 20 with the second resin 24 will be described. FIG. 10 is a cross-sectional view of the secondary battery 101 formed by filling the entire inside of the exterior part 20 with the second resin 24, in the length direction.

As shown in FIG. 10, the exterior part 20 is provided with the second resin 24, which fills the inside thereof. The same resin as the first resin 23 may be used for the second resin 24. In FIG. 10, the second resin 24 is placed entirely inside the exterior part 20, but is not limited to this as long as placed on a position where the power generating element 10 and the exterior part 20 can come into contact with each other. The second resin 24 is preferably placed entirely inside the exterior part 20.

In this way, the exterior part 20 provided with the second resin 24 thereinside can lead to the cylindrical part 21, the inner lids 22, the electrode terminals 30, and the power generating element 10 united into one body with the second resin 24. This can lead to suppression of a short circuit caused by the contact between the power generating element 10 and the exterior part 20. An external impact may break an insulating layer, so that the power generating element 10 and the exterior part 20 come into contact with each other, to cause a short circuit even when, for example, such a predetermined insulating layer is placed on the power generating element 10 or the exterior part 20. In contrast, placing the second resin 24 inside the exterior part 20 can lead to suppression of the contact between the power generating element 10 and the exterior part 20, and thus, can lead to suppression of a short circuit of the battery, compared with a case where only an insulating layer is placed.

The secondary battery 101 provided with the second resin 24 can further improve water vapor barrier properties. Uniting each member into one body with the second resin 24 can lead to suppression of the movement of the power generating element 10 due to an external impact, which can prevent the current collector foils and the tabs 11 and 12 from being cut due to the movement of the power generating element 10. In addition, chipping and slipping-down of the power generating element 10 due to an external impact can be also suppressed.

The method of filling the inside of the exterior part 20 with the second resin 24 is not particularly limited. For example, a hole via which the second resin 24 is poured may be formed at a predetermined point of the cylindrical part 21 and/or the inner lids 22. The shape of the hole is not particularly limited, but may be in the form of a circle, an ellipse or a rectangle. At least one hole may be formed in the cylindrical part 21, or in any of the inner lids 22. For example, as shown in FIG. 4C, plural holes 21c and 21d having different shapes may be formed in a side face of the cylindrical part 21. As shown in FIG. 6A, plural holes 22f may be formed in the face 22a of the inner lid 22. When a power generating element of a solution-based battery is used as the power generating element, a predetermined electrolytic solution may be poured via the hole(s) after the exterior part 20 is filled with the second resin 24.

Figure 11:
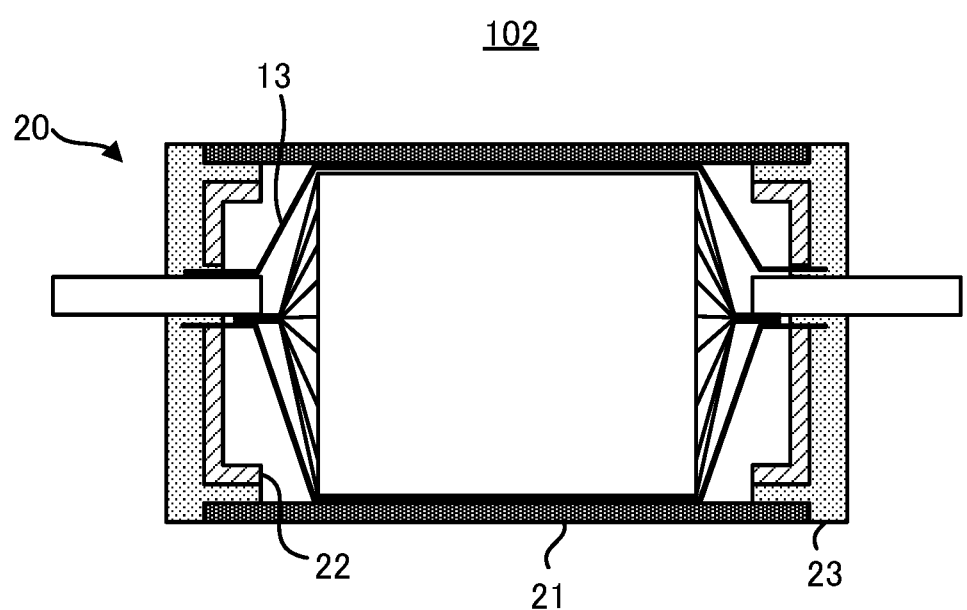
FIG. 11 is a cross-sectional view of a secondary battery 102 in the length direction.
Figure 12:
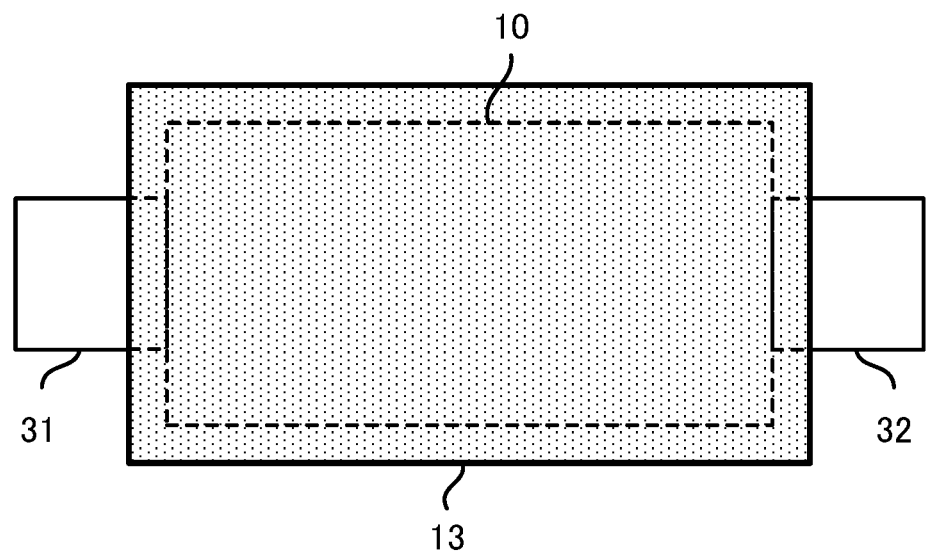
FIG. 12 is a plan view of a power generating element 10 wrapped in a resin film 13.

Next, a secondary battery 102 including the power generating element 10 wrapped in an insulating resin film 13 having water vapor barrier properties will be described. FIG. 11 is a cross-sectional view of the secondary battery 102 including the power generating element 10 wrapped in the resin film 13, in the length direction. FIG. 12 is a plan view of the power generating element 10 wrapped in the resin film 13.

As shown in FIGS. 11 and 12, the resin film 13 has a cylindrical shape, and has openings on sides where the electrode terminals 30 are placed. The entire power generating element 10 is wrapped in the resin film 13. FIG. 12 shows portions of the members which are positioned inside the resin film 13 in dotted lines. In addition to the power generating element 10, at least part of the respective electrode terminals 30 may be further wrapped in the resin film 13. For example, as shown in FIG. 11, the ends of the resin film 13 may pass through the through holes 22d of the inner lids 22, so that part of the respective electrode terminals 30 which are positioned inside the first resin 23 may be wrapped therein. This can lead to the resin film 13 fixed with the first resin 23. In this way, the power generating element 10 entirely wrapped in the resin film 13 can lead to suppression of a short circuit caused by the contact between the power generating element 10 and the exterior part 20. The secondary battery 102 provided with the resin film 13 can further improve water vapor barrier properties.

The resin film 13 is sufficient as long as being an insulating resin film having water vapor barrier properties. Examples of the resin film 13 include aluminum- or silica-deposited resin films. The resin is not particularly limited, but examples thereof include polypropylene and polyethylene terephthalate.

The power generating element 10 may be wrapped in the resin film 13, and at the same time, the inside of the exterior part 20 may be filled with the second resin 24.

Other Embodiments of Cylindrical Part

The cylindrical part 21 may be a cylindrical metal body, or a cylindrically-shaped metal laminate film as shown in FIG. 3 in view of structural efficiency, and is preferably a cylindrical metal body. In contrast, it is difficult for such a cylindrical part to house the power generating element 10 thereinside, which is problematic. Thus, the following cylindrical part 121 or 221 that is easy to house the power generating element 10, may be used.

Figure 13A:
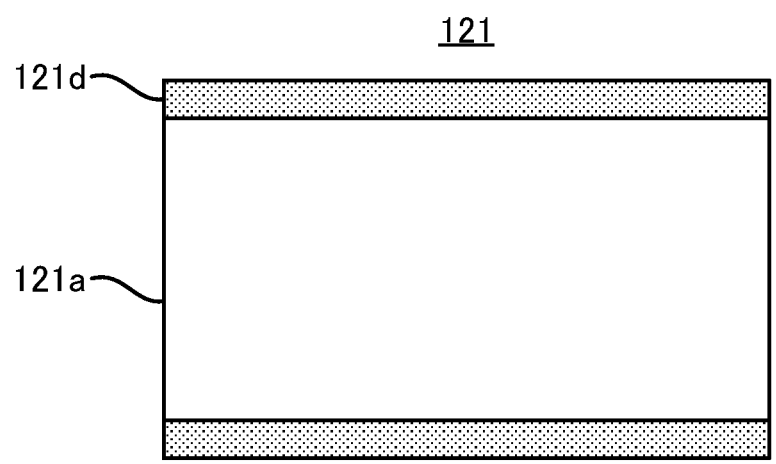
FIG. 13A is a plan view of a cylindrical part 121.
Figure 13B:
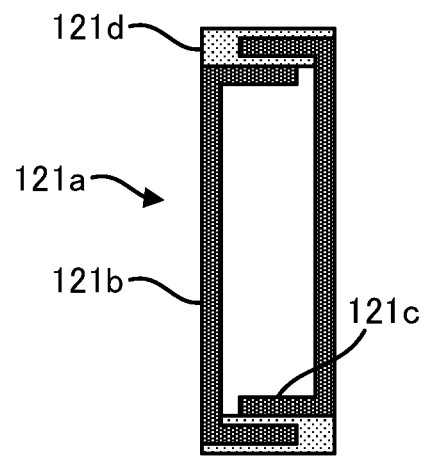
FIG. 13B is a cross-sectional view of the cylindrical part 121 in the width direction.

First, the cylindrical part 121 will be described. FIG. 13A is a plan view of the cylindrical part 121, and FIG. 13B is a cross-sectional view of the cylindrical part 121 in the width direction. As shown in FIGS. 13A and 13B, the cylindrical part 121 is formed of two metal plates 121a, and a third resin 121d. The metal plates 121a are so-called U-shaped members each provided with a bottom face 121b, and protruding parts 121c protruding in the same direction from the opposite ends of the bottom face 121b. As shown in FIG. 13B, the two metal plates 121a are superposed on each other as facing in the opposite directions; and the protruding parts 121c of the two metal plates 121a overlap with each other in the opposite side faces of the cylindrical part 121 (faces of the cylindrical part 121 in the width direction). The third resin 121d is placed so as to cover each of the side faces of the cylindrical part 121. Specifically, the third resin 121d entirely covers the overlapping protruding parts 121c of the superposed metal plates 121a on the side face sides, and at the same time, fills each space between the overlapping protruding parts 121c of the metal plates 121a. This leads to the respective overlapping end portions of the metal plates 121a united into one body with the third resin 121d.

The cylindrical part 121 is provided with the two metal plates 121a. Thus, the cylindrical part 121 can be made by: placing the power generating element 10 inside one of the metal plates 121a; thereafter, superposing the other metal plate 121a on the one metal plate 121a as the other metal plate 121a faces in the opposite direction to the one metal plate 121a; and uniting the protruding parts 121c of the metal plates 121a into one body with the third resin 121d. In this way, using the cylindrical part 121 can easily lead to the power generating element 10 housed inside the cylindrical part 121.

Figure 14A:
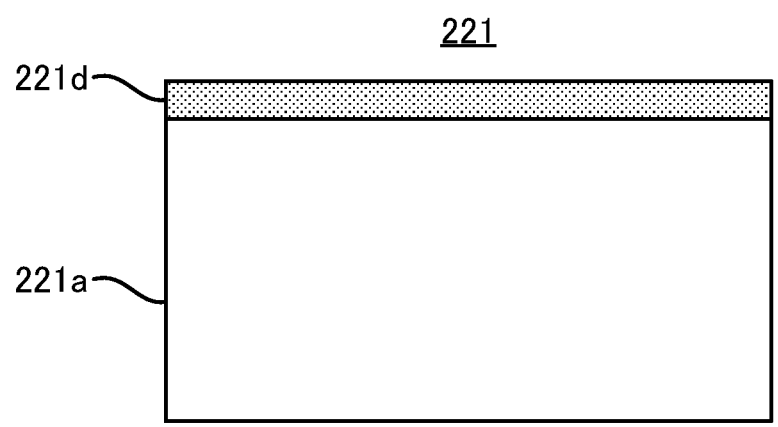
FIG. 14A is a plan view of a cylindrical part 221.
Figure 14B:
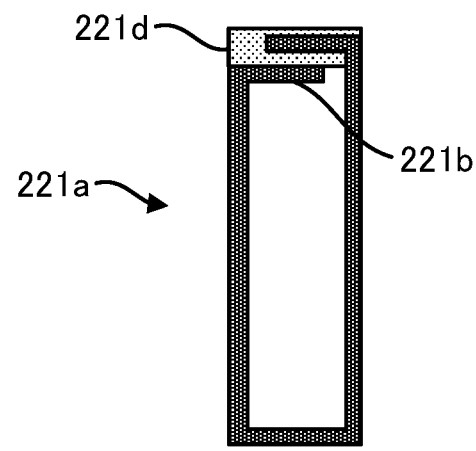
FIG. 14B is a cross-sectional view of the cylindrical part 221 in the width direction.

Next, the cylindrical part 221 will be described. FIG. 14A is a plan view of the cylindrical part 221, and FIG. 14B is a cross-sectional view of the cylindrical part 221 in the width direction. As shown in FIGS. 14A and 14B, the cylindrical part 221 is formed of one metal plate 221a and a third resin 221d. The metal plate 221a is shaped into a cylinder. End portions 221b of the metal plate 221a overlap with each other in one side face of the cylindrical part 221. The third resin 221d is placed so as to cover the side face, where the end portions 221 overlap with each other. Specifically, the third resin 221d entirely covers the overlapping end portions 221b on the side face side, and at the same time, fills the space between the overlapping end portions 221b of the metal plate 221a. This leads to the overlapping end portions 221b of the metal plate 221a united into one body with the third resin 221d.

Figure 15:
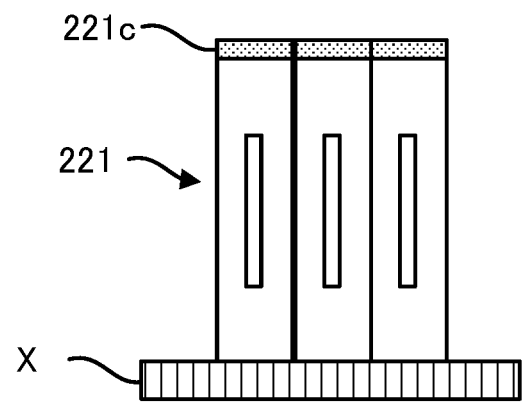
FIG. 15 shows one cooling mode of a secondary battery with the cylindrical parts 221.

The cylindrical part 221 is provided with the one metal plate 221a. Thus, the cylindrical part 221 can be made by placing the power generating element 10 inside the cylindrical metal plate 221a, and thereafter, uniting the end portions 221d into one body with the third resin 221d. In this way, using the cylindrical part 221 can easily lead to the power generating element 10 housed inside the cylindrical part 221. The secondary battery can be easily cooled by making a side face of the cylindrical part 221 where no third resin 221d is placed, in contact with a predetermined cooling part X as shown in FIG. 15. Such a cooling mode may be also applied to the secondary battery in which the cylindrical part 21 is used.

The metal plates used in the above two embodiments may be simple metal plates, or metal laminate films, and are preferably metal plates. Any metal may be used as long as having excellent water vapor barrier properties. For the third resin used in the above two embodiments, the same resin as the first resin 23 may be used. "United into one body" with the third resin can be performed by placing the superposed metal plates 121a or the cylindrically shaped metal plate 221a in a predetermined metal mold, and pouring and curing the third resin in the metal mold. According to this, the cylindrical parts 121 and 221 can be manufactured.

The secondary battery according to the present disclosure has been described above mainly using the secondary battery 100 as one embodiment. As described above, the structural efficiency of the secondary battery according to this disclosure can be improved. The secondary battery according to the present disclosure may be used for every purpose. For example, the secondary battery according to the present disclosure can be used as an in-car secondary battery.

REFERENCE SIGNS LIST 10 power generating element
11, 12 tab
13 resin film
20 exterior part
21, 121, 122 cylindrical part
21a opening
21b protruding part
21c hole
21d hole
22 inner lid
22a face
22b protruding part
22c space
22d through hole
22e tapered part
22f hole
23 first resin
24 second resin
30 electrode terminal
31 cathode terminal
32 anode terminal
100, 101, 102 secondary battery
121a, 221a metal plate
121b bottom face
121c protruding part
121d, 221d third resin
221b end portion

What is claimed is:

1. A secondary battery comprising:
a power generating element; and
an exterior part housing the power generating element there inside, wherein
the exterior part has: a cylindrical part having openings in respective two facing faces thereof; inner lids placed in the openings, respectively; and a first resin placed so as to cover each of the openings, and each face of the inner lids on opening sides,
the first resin is disposed adjacent to the cylindrical part and outside of the inner lids and covers the inner lid, and
the cylindrical part and the inner lids are united into one body with the first resin.

2. The secondary battery according to claim 1, further comprising:
an electrode terminal connected to the power generating element, wherein
the inner lids each have the face placed on the opening side of the cylindrical part, a protruding part protruding towards an inside of the cylindrical part from an entire circumference of the face, and a space surrounded by the protruding part,
at least one of the inner lids has a through hole in the face thereof,
the electrode terminal is arranged so as to be thorough the through hole,
the first resin placed on a side of said at least one of the inner lids, said at least one of the inner lids being penetrated by the electrode terminal, is placed so as to further cover at least part of a periphery of the electrode terminal, and so as to fill a space between the through hole and the electrode terminal, and
the cylindrical part, the inner lids, and the electrode terminal are united into one body with the first resin.

3. The secondary battery according to claim 1, wherein
the exterior part has a second resin filling an inside thereof, and
the cylindrical part, the inner lids, the electrode terminal, and the power generating element are united into one body with the second resin.

4. The secondary battery according to claim 1, wherein
the power generating element is wrapped in an insulating resin film having water vapor barrier properties.

5. The secondary battery according to claim 1, wherein
the cylindrical part is a cylindrical metal body, or a cylindrically shaped metal laminate film.

6. The secondary battery according to claim 1, wherein
the cylindrical part is formed of two metal plates and a third resin,
the metal plates each have a bottom face, and protruding parts protruding in the same direction from facing end portions of the bottom face,
the metal plates are superposed on each other as facing in the opposite directions,
the protruding parts overlap with each other in respective opposite side faces of the cylindrical part,
the third resin is placed so as to cover each of the side faces of the cylindrical part, and
the overlapping end portions of the metal plates in each of the side faces are united into one body with the third resin.

7. The secondary battery according to claim 1, wherein
the cylindrical part is formed of one metal plate and a third resin,
the metal plate is shaped into a cylinder,
end portions of the metal plate overlap with each other in one side face of the cylindrical part,
the third resin is placed so as to cover the side face, where the end portions overlap with each other, and
the overlapping end portions of the metal plate are united into one body with the third resin.

8. The secondary battery according to claim 1, wherein the cylindrical part has a rectangular cross-sectional shape in the width direction.

9. The secondary battery according to claim 1, wherein the cylindrical part has a thickness of 0.05 mm to 0.2 mm.

\* \* \* \* \*